Patented Apr. 8, 1947

2,418,745

UNITED STATES PATENT OFFICE 2,418,745

QUICK FREEZING OF FOODSTUFFS

Luis H. Bartlett, Austin, Tex., assignor to Texas Research Corporation, Austin, Tex., a corporation of Texas No Drawing. Application March 24, 1941, Serial No. 385,012

22 Claims. (Cl. 99—192)

This invention relates to the preservation of fruits, berries and other food material by lowering its temperature and then storing the food at a refrigerating temperature. Its primary object is the provision of a simple and efficient method for the chilling or quick freezing of articles and material, including foodstuffs by direct contact with a refrigerated heat transfer medium.

An important feature of the invention consists in the provision of an improved heat transfer medium in such form as to provide for quick freezing without any marked change in the temperature of the chilling medium.

An object of the invention is to provide a process of bringing articles into direct contact with a metastable polyphase refrigerating medium to quick freeze the articles and to form upon them an enveloping film of the supercooled solution and then storing the frozen and coated articles at a temperature at which the film is metastable. A metastable system is one which tends to lose energy and thus become stable but is prevented by prevailing conditions of restraint (such as pressure or temperature) from reaching thermodynamic equilibrium.

The metastable film will solidify completely if maintained below its eutectic temperature, while partial solidification occurs if held between the eutectic and the transition temperatures. The components and proportions of the system are chosen so that the stable film contains sufficient solute solid phase to cause it to adhere permanently to the frozen food as long as the temperature is held within the desired limits. It is thus possible to maintain a metastable polyphase medium of high viscosity at temperatures sufficiently low so that unusually fast freezing of food is secured and so that the solute solid phase will form at a very low rate; then the film adhering to the frozen food is stabilized to form a substantially permanent protective coating to retard desiccation and oxidation.

At the present time the better known methods of quick freezing of foods include the use of a refrigerated liquid. This is sometimes sprayed on the food but more frequently the food is immersed for an appreciable length of time in the liquid refrigerating medium which may have as its solute an inorganic salt, certain alcohols, and many other substances.

There are four major objections to the use of such a solution as the direct contact heat transfer medium, namely:

(1) The temperature of the surfaces used to cool the liquid must be carefully controlled to prevent deposition of a solid phase which would seriously impede heat transfer.

(2) Dilution of the liquid with juices or wash water from the foodstuff will cause the deposition of a solid on the chilling surfaces even at normal operating temperature.

(3) The liquid becomes contaminated by fragments of foodstuff which would deposit on the chilling surfaces unless agitated.

(4) The rate of heat transfer is a function of liquid velocity and of fluidity. Fragments of foodstuff and extracted matter decrease the fluidity, decrease heat transfer, and increase the power required to maintain liquid circulation. Such losses become serious when solutions of high viscosity, such as sirups, are employed.

I find that all four of these disadvantages can be overcome or may be converted to advantages by substituting for the liquid of the prior art a polyphase heat transfer medium, i. e., a medium in which the material of the solvent of the solution is present in both the liquid and the solid phase. Since the heat capacity of such a polyphase medium is much greater than that of the liquid medium a small quantity of such polyphase heat transfer medium will transfer as much heat as a considerably larger quantity of liquid. In this manner a smaller machine using the polyphase heat transfer medium will require less of the medium and yet in a given period of time may freeze the same quantity of foodstuff as a much larger machine using the liquid while a machine of the same size will increase in large measure the output of frozen or chilled material.

In using such a polyphase heat transfer medium no close control of the temperature of the surface used to chill the medium is necessary, since obviously the formation of the solid phase is required in addition to the liquid phase. Dilution of such medium by foodstuff juices does result in an increase in the amount of the solid phase present but when using the polyphase medium the normal operation proceeds until dilution has occurred to such an extent as would have rendered the liquid medium useless. Contamination of the medium by the foodstuff fragments presents no difficulty for an equilibrium is soon reached in which the frozen product carries such fragments out of the medium at the same rate as they enter.

The heat transfer rate is almost but not quite independent of the circulation rate and it is possible to secure a remarkably quick freezing with a slow velocity of the fluid and a smaller power dissipation. As an example of the differences in heat capacity, a water solution of invert sugar containing 59% of sugar has a heat capacity of .67 against an apparent heat capacity for a polyphase sirup medium of the same ingredients of 2.44, thus making the heat capacity of the latter 3.65 times the heat capacity of the water solution of the sugar.

The preferred chilling medium consists of a semi-liquid mixture of a freezing point depressing solute dissolved in a suitable solvent and containing finely divided particles of the solid phase of the solvent, which may, but need not, contain the solid phase of the solute, for example, a sugar such as sucrose, glucose, fructose, or any combination of these carbohydrates, preferably, from an economic standpoint, cane sugar inverted by the use of an inverting agent, such as hydrochloric acid.

Metastable systems may be unicomponent or polycomponent. The coexistence of more than one allotropic form of an element at other than the transition restraining conditions is a unicomponent metastable system. White tin is the stable form at atmospheric pressure and 18° C. and gray tin is the stable form below this temperature. The two forms may coexist for lengthy periods at temperatures and pressures far removed from these limits. White tin is widely used for lining containers which are used at temperatures far below 18° C., a range within which it is metastable. The gray form of tin, which is stable below 18° C., is quite unsuitable as a container coating. Glass is an example of a polycomponent metastable system. In the metastable state it is of wide utility, transparent, lustrous, elastic, and possessed of considerable mechanical strength. When in the stable state it is opaque, dull, brittle and weak and thus of very limited utility. Many commonly useful substances owe their utility entirely to the metastable state and become of negligible value when an equilibrium state is attained. This transient condition may be relatively brief or it may endure for thousands of years, but when it is past, usefulness is lost.

The utility of the polycomponent metastable systems which I employ as heat transfer media and as a means of securing a protective coating in the art of food freezing, is dependent upon the following characteristics.

(1) They may be operated at lower temperatures than stable systems of the same components and thus effect faster freezing of the foods with which they are brought into contact.

(2) They have the peculiar property of at once separating one component (the solvent) in the solid phase, when the temperature is rapidly reduced to a point which depends upon the composition and proportions of the system, while the formation of the solid phase or phases of the other component or components (the solute) is completely or greatly repressed. When such a system formulated for high viscosity is rapidly chilled and simultaneously slowly agitated, the resultant solvent solid phase may be made to separate in minute particles which are easily maintained in a dispersed state. High viscosity assists in stabilizing the dispersion by offering high resistance to the movement of small particles through the liquid. This retards the floating or sinking of the particles and prevents their agglomeration. The distributed solid phase increases the thermal conductivity of the medium (since $k$ for most solid solvents is greater than for their solutions; particularly is this true of water) and thus speeds freezing. Most foods contain large quantities of water and when these are frozen, the predominating solid phase is ice. To freeze these foods, which often subcool markedly, I employ a metastable system in which the solvent is water and the corresponding dispersed solid phase is ice. This ice decreases subcooling by its "seeding" action (supplying crystallization nuclei) and thus still further speeds freezing of the food.

(3) After freezing is completed (this does not mean complete solidification of the food, but attainment of the desired temperature) the food is removed from contact with the bulk of the metastable medium by gravity draining alone or assisted by a blast of chilled gas. The food, which is inclosed by an adherent film of the medium is placed in chilled storage. After the passage of sufficient time, this film will pass to the stable form, that is the solute will separate in a solid phase until equilibrium is attained. This action may be hastened as hereinafter described.

A solution containing 35 parts of anhydrous glucose, 65 parts of sucrose and from 57 to 80 parts of water forms an excellent metastable medium. The highest temperature at which it is metastable has not been determined, but it is supersaturated with glucose at 0° F. and the eutectic temperature is an undetermined lower point. It forms coatings which are superior to the water-sucrose-invert sugar medium. The freezing characteristics are quite satisfactory, it may be operated for several days in the metastable state before the solid sugar phase becomes troublesome. In using such media it is necessary to periodically heat it to a temperature at which the solute solid phase will pass into solution and then recool to the metastable condition. Heating to 80° or 100° F. with agitation for a short period, followed by chilling to 0° F. is preferred.

From the viewpoint of the commercial food freezer the water-sucrose-glucose medium is much superior to the water-sucrose-invert sugar medium. In case of dilution, it may be strengthened by the addition of dry glucose and sucrose in the proper proportions without adding more water. Water is unavoidably added when the medium is fortified by commercially available concentrated invert sirup, since anhydrous invert sugar is not a commercial product while anhydrous glucose and sucrose are easily and cheaply available. Systems in which glucose composes from 30% to 50% of the solute are satisfactory, but the best is the 35% glucose medium described above.

The addition of a viscosity increasing substance such as colloids, gelatin, agar-agar, Irish moss, dextrin, starch, gums, pectin, alginates, albumin, often increases the efficiency of the process. Initial freezing points of the solutions between +5° and −5° F. (the temperature at which the solid phase of the solvent begins to separate and which is independent of the eutectic temperature) are desirable, and viscosities from 5 to 100 poises between these temperature limits are advantageous. The medium may be metastable and supercooled as for example when supersaturated with the solute at the prevailing restraining conditions; or it may be stable, as when the solute is present in quantity less than saturation.

The advantages of a high viscosity liquid phase are that the solvent solid phase separates in smaller particles and that these particles are held more uniformly dispersed than in the case of a low viscosity liquid phase. For instance, a medium composed of sucrose, ethyl alcohol, and water is an advantageous medium for freezing certain foods but the viscosity of such a medium (formulated to separate an ice phase between +5° and −5° F.) is low; the ice will form large crystals and they will collect upon the liquid surface unless vigorous agitation is used. The addition of gum arabic will increase the viscosity so that ice will separate in very small crystals and remain dispersed even at very low agitation rates. Colloidal substances have a negligible freezing point depressing effect.

Where a slush of these types is employed the material may remain in the chilled bath until it is frozen to the required degree. This causes no appreciable rise in the temperature of the cooling bath because the heat removed from the food product is largely absorbed by the slush of sugars and finely divided ice, as latent heat of fusion, thus increasing the total heat of the medium without marked rise in temperature.

It is obvious that the rate of heat transfer is considerably higher than if a completely liquid bath were used, for the temperature of the liquid bath would be raised by the absorption of the heat from the product which is being frozen. In an invert sugar sirup of the type previously described the composition of the sugar solids may be in the general proportions of three parts of sucrose to seventeen parts of invert sugar, that is, sucrose 15%, invert sugar 85%. I may use either sucrose, fructose, or glucose alone but prefer the mixtures stated and may include the presence of the solid phase of these sugars with the finely divided particles of ice. The solid sugar is useful in the later storage. The rate of growth of the stable phase is slow at temperatures below the storage temperature but when the residual film of medium upon the frozen food is placed in storage at 0° F., the rate of growth of the stable solid phase is increased by the higher temperature and decreased viscosity, and the film soon loses fluidity so that it remains upon the surface of the frozen food during the storage period.

My preference is that the temperature be below the eutectic point of the system, which is about 7° F. (−13.9° C.) for the sucrose-water medium for above that temperature a sucrose solution will become less satisfactory because of the rapid growth of the solid sugar phase, whereas with the mixed solution mentioned above I can take the temperature a dozen or more degrees lower, roughly to −6° F.

The food may be brought into direct contact with the polyphase medium either by spraying or immersion, preferably the latter. After the freezing of the food the medium is separated or removed in any desired manner, leaving an edible protective coating of, for example, the metastable supercooled sugar solution as a protective film which solidifies after a period of time in refrigerated storage at a temperature somewhat lower than the eutectic temperature of the solution. Partial solidifying may occur at temperatures far above the eutectic temperature. If desired the solidifying of this film may be hastened by dusting the food with a powder composed of the solid phase of the solute employed in the freezing medium.

While the storage temperature may readily be above the eutectic point, it should not be high enough to cause re-dissolving of solid phases. If only the efficiency of the coating were considered, it would be desirable to store at or below the eutectic temperature. The eutectic data for water-mixed sugar systems are lacking. However it is reasonable to assume that such systems are no exception to the rule that a ternary eutectic temperature is lower than that of the binary eutectic of any pair of components, also that the same relation holds for quaternary and ternary eutectics. Now the water-sucrose-invert sugar medium is a four component system and I have experimentally determined that the quaternary eutectic temperature is lower than −24° C. (−11.2° F.). Since commercial frozen storage is about 0° F., it would normally be impractical to store food coated with such a medium below its eutectic point. However a coating of such metastable medium would separate out at 0° F. a stable phase of glucose which serves to hold the remaining stable liquid phase upon the surface of the food.

Sugar solutions which are metastable at room temperature are not useful coating media for foods which contain water, except at temperatures such that an ice phase is present and in equilibrium. Thus, if an unfrozen slice of peach were coated with a metastable sugar solution, diffusion of water into the sugar solution would soon dilute the sirup to a stable concentration. This does not occur if the peach is at the same temperature as the sirup and the sirup is at a concentration which is in equilibrium with ice. Then, after a lapse of time the metastable solution changes to two or more stable phases. This temperature is lower than 32° F. and will vary with the nature and concentration of sugars in the solution. A second factor of practical importance is that foods are best preserved below 15° F. I prefer a zero storage as at this temperature the coating is substantially permanent and there is no appreciable osmosis or transfer of odors.

I find a 50 to 60% sirup satisfactory and economical as it may be used for a number of weeks without any mold growth. Naturally the solution must be kept at a pH compatible with the particular fruit, vegetable, or other article being frozen, but this is a simple matter as the point is not critical. The temperature of operation is preferably appreciably below the initial freezing range of the article being frozen, for example, many fruits are conveniently treated between 7° F. and 5° F. but I prefer an operating temperature between +2° F. and −4° F., though variations from this range may be permitted to occur. Although when the temperature of the freezing solution rises to a point where there would no longer be any crystals present in the solution, refrigeration still continues, it is preferred not to let the temperature increase to this extent for a better rate of heat transfer is had with an appreciable quantity of crystals in the solution.

An important difference between my process and those of the prior art lies in the fact that my solid phase of the solvent is present not only in finely divided form but these particles are highly dispersed throughout the solution. I have experimentally determined that the rate of heat transfer depends upon the size of the particles and their dispersion, hence I chill quickly and with agitation as thus there is obtained a fine dispersion with its consequent high rate of heat transfer from the food to the medium without marked increase of the temperature of the latter.

The contact time required to freeze various foods to their centers varies with the characteristics of the food and with the size of the pieces. As a general indication carrots cut to inch cubes freeze to the center from 77° when approximately 155 B. t. u./pound has been removed. This can take place in as little as 6.4 minutes. At 8 minutes an average of 163 B. t. u./pound has been removed with a polyphase water-invert sugar media at 1.5°, whereas with the same time and temperature a similar medium but in liquid phase would only have removed an average of 142 B. t. u./pound.

Using a polyphase water-invert sugar medium at 2° F., peeled and cored apples divided into eighths require an average of time which varies with their size, for example, Jonathan two-inch require only about five or six minutes immersion; two and one-half inch King David average about 8 minutes and Stark of three-inch size would run as high as ten minutes, from which we might say that the contact time for ordinary apples is from 6 to 9 minutes. In similar manner, whole bananas one-inch size take from ten to twelve minutes; whole figs about one and one-half inches, lye-peeled, require from 13 to 17 minutes; segmented grapefruits, five to eight minutes; strawberries, 6 to 8 minutes; halved prunes, 4 minutes; snap beans, 4 minutes; green peas, 3 minutes; disjointed one and one-half pound frying chickens, from 5 to 11 minutes; pork shoulder, cut in three-quarter slices, about 6 minutes, etc., which will give an idea as to the time required for other foods.

Perhaps the idea of frozen vegetables and meat coated with invert sugar might be startling in spite of the fact that some very excellent cooks add sugar to foods which are not ordinarily considered as being sweet. Experiments indicate that snap beans are improved in flavor by the coating of sugar although the amount which adheres is insufficient to impart a sweet taste to the cooked vegetable. The sirup adhering to chicken and pork produced a very attractive brown surface when fried or broiled but here again no sweet taste was present. It is certain that a sirup film offers a considerable protection against oxidation and dehydration, and for this reason it seems desirable to quick-freeze suitable vegetables and flesh foods by contact with the sugar-water polyphase medium.

Attention is also invited to the fact that frozen foods such as sliced peaches when discharged from the freezer at temperatures of 10° F., and packaged in 20-pound cans, will modify in 0° F. storage after as little as twenty-four hours and the contents of the can will be found almost as solidly frozen together as if the conventional sharp freezing process had been employed. This occurs because the amount of the solid phase present in a food varies with the temperature so that when the food frozen at +10° F. is further chilled to 0° F. in storage an additional formation of the solid phase occurs and this acts as a cementing material firmly uniting the articles into a solid mass. An entirely different effect is obtained by chilling to 0° F. before packaging and storing in rooms which are held substantially at this temperature. No freezing together occurs and the product may be transferred from one container to another almost as readily as an equivalent quantity of crushed rock.

What I claim is:

1. The process of quick freezing food articles which consists in bringing the articles into direct contact with a metastable polyphase refrigerating medium containing a sugary freezing point lowering solute and finely divided particles of the solid phase of the solvent, separating from the articles the major portion of the adhering solution, and refrigerating the medium to remove the heat taken up by the medium during the quick freezing of the articles at such rate as to form further finely divided particles of the solid phase of the solvent.

2. The process of claim 1 in which the solute is roughly one part of anhydrous glucose to two parts of sucrose.

3. The process of claim 1 in which the solute is roughly one part of sucrose to five parts of invert sugar.

4. A process for refrigerating articles of food by causing contact between the articles and a refrigerating medium composed of a metastable solution in which is dispersed finely divided particles of the solid phase of the solvent and in which the solid phase of the solute is present.

5. A refrigerating medium comprising a solution of a freezing point depressing solute containing finely divided particles of the solid phase of the solvent and a substance imparting high viscosity to the liquid phase, whereby the particles will remain dispersed at low agitation rates.

6. A refrigerating medium comprising a water solution of glucose and sucrose having therein fine particles of ice highly dispersed throughout the solution whereby to obtain a high rate of transfer of heat from the substance being chilled to the medium without marked increase of temperature in the latter.

7. The medium of claim 6 in which the glucose forms from 30% to 50% of the solute.

8. The medium of claim 6 in which the glucose forms about 35% of the solute and the solution contains a substance imparting an increased viscosity to the water to retain the high dispersion of the finely divided ice without strong agitation.

9. The process of quick freezing food articles which consists in contacting such articles with a high viscosity polyphase medium in which the solid phase of the solvent is present as fine, dispersed particles, the temperature of the medium being between 5° and −5° F., the high viscosity at this temperature causing the solid phase to be present in smaller particles than if the viscosity were low.

10. The art of quick freezing food articles which comprises the steps of bringing the articles into direct contact with a chilled slush while extracting heat units from the slush at such rate that the slush is not completely liquefied while contacting the articles, whereby the freezing action is accelerated since the solid component of the slush transfers heat units from the articles at a more rapid rate than does the liquid component thereof, and in which the liquid component of the slush holds sugar in solution and the proper fluid concentration is substantially maintained by removing water in the solid phase as the food articles are taken from the slush.

11. The art of increasing the thermal effectiveness of a highly viscous sugar solution having an initial freezing point lower than 5° which consists in agitating the solution while holding the solution at a temperature well below such initial freezing point whereby to form in the solution a dispersed solid phase of very small ice crystals whereby heat transfer from immersed foodstuffs to the solution is very fast and nearly independent of fluid velocity.

12. The method of preserving food articles which consists in subjecting same to the direct action of a refrigerating medium consisting of a slurry of ice particles, sugar particles and water for an interval of time to freeze the food articles, withdrawing the froozen food articles from the medium with an adhering coating of the medium, and storing the frozen food articles with their coats of ice particles, sugar particles, and the liquid portion of the medium at a temperature lower than that which would cause a dissolving of the solid phases of the coating, that is, a temperature at which the ice particles and the sugar particles will remain in that form.

13. The process of preventing the freezing together of packed frozen food products stored at temperatures approximating 0° F. which consists in sharp chilling the food in a chilling medium, in separated pieces to a temperature of zero, then packaging the chilled food and storing the packages at a temperature approximating zero, whereby the stored food may thereafter readily be transferred from one container to another as individual pieces, in which the medium is quite viscous and contains fine ice particles and particles of sugar in such quantity that the food when withdrawn from the freezing medium is coated to the consistency of soft cake icing with ice particles and sugar particles, whereby in storage the solid particles of the coating will block to a large extent the diffusion of gas and vapor which would occur in an all liquid coating.

14. The process of preserving frozen foodstuff material which comprises coating the material with an edible metastable solution containing fine ice particles, and storing the coated material at a refrigerating temperature at which the metastable coating will tend to form at least one stable phase.

15. A refrigerating medium adaptable for use in freezing food articles comprising an aqueous medium containing a freezing point depressing solute and finely divided particles of ice dispersed therein, the liquid phase of said medium having a sufficiently high viscosity to substantially retard segregation of the finely divided ice particles into agglomerated masses.

16. A process of preserving frozen foodstuff material which comprises contacting the material with a super-saturated sugar solution containing fine ice particles to form on the material an enveloping coating and storing the material at a refrigerating temperature at which solid sugar separates in the enveloping coating.

17. The process of preserving frozen foodstuff material which comprises contacting the material with a sugar solution containing fine ice particles in the metastable state with respect to the solute to form on the material an enveloping film, contacting the enveloping film with additional solid sugar in finely divided form to hasten the solidifying of the film in storage, and storing the enveloped material at a refrigerating temperature at which further sugar will tend to separate.

18. The process of quick freezing foodstuff which consists in contacting the material to be chilled with a solution having therein finely divided, highly dispersed particles of the solid phase of the solvent, said solution being viscous with sufficient viscostiy to retard segregation of said particles into an agglomerated mass, and separating the material, when sufficiently chilled, from the bulk of the solution.

19. The step in the process of quick freezing set forth in claim 18, which consists in agitating the viscous heat transfer solution while chilling same, at such a rate and temperature as to produce further finely divided particles of the solvent.

20. The method of preserving food articles which consists in subjecting same to the direct action of a refrigerating medium comprising as a major portion a slurry of ice particles in a metastable sugar solution for an interval of time sufficient to freeze the food, withdrawing the articles with their adhering coatings of the medium, and storing the coated frozen articles at a temperature below that which would cause a dissolving of the solid phase of the coating.

21. The art of quick freezing food articles which comprises the steps of bringing the articles into contact with a chilled slush comprising as a major portion fine ice particles, water, and a freezing point depressing agent, maintaining the ice dispersed in the mixture, and extracting heat units from the slush at such rate that the slush is not completely liquefied while contacting the articles, whereby the freezing action is accelerated since the ice of the slush transfers heat units from the articles at a more rapid rate than does the liquid component thereof, and separating the food articles when sufficiently frozen, from the bulk of the slush.

22. The process of maintaining a refrigerating medium for chilling material in advantageous condition for quick freezing, which consists in chilling a slushy medium comprising as a major portion, water, fine ice particles, and a freezing point depressing agent, to produce further finely divided particles of ice at a rate approximately equalling the rate of melting of the ice by absorption of heat from the material being chilled, while agitating the medium, the agitated medium being of such a viscosity as to maintain the ice particles highly dispersed and whereby a high rate of heat transfer is obtained without marked increase in the temperature of the medium.

LUIS H. BARTLETT.

REFERENCES CITED

The following references are of record in the file of this patent:

UNITED STATES PATENTS

| Number | Name | Date |
|---|---|---|
| 2,164,362 | Taylor | July 4, 1939 |
| 1,129,716 | Ottesen | Feb. 23, 1915 |
| 2,140,043 | Zarotschenzeff | Dec. 13, 1938 |
| 2,225,669 | Taylor | Dec. 24, 1940 |
| 2,286,225 | Noyes | June 16, 1942 |

OTHER REFERENCES

Getman and Daniels, Outlines of Physical Chemistry, 7th edition; John Wiley & Sons, N. Y. C., pages 321 and 323. (Copy in Div. 3.)